(12) United States Patent
Mixter et al.

(10) Patent No.: US 12,465,282 B2
(45) Date of Patent: Nov. 11, 2025

(54) USING AMBIENT LIGHT SENSORS AND AMBIENT AUDIO SENSORS TO DETERMINE SLEEP QUALITY

(71) Applicant: Google LLC, Mountain View, CA (US)

(72) Inventors: Kenneth Mixter, Mountain View, CA (US); Ashton Udall, Mountain View, CA (US)

(73) Assignee: Google LLC, Mountain View, CA (US)

( * ) Notice: Subject to any disclaimer, the term of this patent is extended or adjusted under 35 U.S.C. 154(b) by 341 days.

(21) Appl. No.: 18/014,588

(22) PCT Filed: May 11, 2021

(86) PCT No.: PCT/US2021/031744
§ 371 (c)(1),
(2) Date: Jan. 5, 2023

(87) PCT Pub. No.: WO2022/010573
PCT Pub. Date: Jan. 13, 2022

(65) Prior Publication Data
US 2023/0355169 A1    Nov. 9, 2023

Related U.S. Application Data

(60) Provisional application No. 63/082,386, filed on Sep. 23, 2020, provisional application No. 63/049,493, filed on Jul. 8, 2020.

(51) Int. Cl.
*A61B 5/00*    (2006.01)
*A61B 5/11*    (2006.01)
(Continued)

(52) U.S. Cl.
CPC .......... *A61B 5/4815* (2013.01); *A61B 5/1113* (2013.01); *A61B 5/4812* (2013.01); *F24F 11/80* (2018.01); *F24F 2110/10* (2018.01)

(58) Field of Classification Search
CPC .... A61B 5/1113; A61B 5/4812; A61B 5/4815
See application file for complete search history.

(56) References Cited

U.S. PATENT DOCUMENTS

2011/0190594 A1    8/2011    Heit et al.
2013/0338446 A1    12/2013    Van Vugt et al.
(Continued)

OTHER PUBLICATIONS

International Search Report and Written Opinion mailed on Aug. 25, 2021 in International Patent Application No. PCT/US2021/031744, 16 pages.

*Primary Examiner* — Mark A Connolly
(74) *Attorney, Agent, or Firm* — Kilpatrick Townsend & Stockton LLP (57) ABSTRACT

During a sleep session of a user of a display assistant device, the device records sound, movement, and ambient conditions in proximity to the device. The ambient conditions include a light level. The device analyzes the recorded sound and movement to identify throughout the sleep session of the user a time-varying sleep state of the user. The sleep state is characterized by a sleep quality and a sleep phase. The device also analyzes the recorded ambient conditions and the recorded sound throughout the sleep session to identify a plurality of time-varying sleep disturbances occurring during the sleep session of the user. After the sleep session of the user has concluded, the device presents on a screen of the device a sleep summary of the sleep session. The sleep summary includes visual indications of the sleep quality and disturbances identified throughout the sleep session.

19 Claims, 6 Drawing Sheets

(51) Int. Cl.
    *F24F 11/80*     (2018.01)
    *F24F 110/10*     (2018.01)

(56) References Cited

U.S. PATENT DOCUMENTS

| | | | |
|---|---|---|---|
| 2016/0234034 A1* | 8/2016 | Mahar | G05B 15/02 |
| 2017/0055899 A1 | 3/2017 | Bandyopadhyay et al. | |
| 2018/0078197 A1 | 3/2018 | Ware et al. | |

* cited by examiner

USING AMBIENT LIGHT SENSORS AND AMBIENT AUDIO SENSORS TO DETERMINE SLEEP QUALITY

CROSS-REFERENCE TO RELATED APPLICATIONS

This application is a 371 National Stage filing of PCT Application No. PCT/US2021/031744, filed May 11, 2021, which claims priority to U.S. Provisional Application No. 63/049,493, filed Jul. 8, 2020, and U.S. Provisional Application No. 63/082,386, filed Sep. 23, 2020, the full disclosures of which is hereby incorporated by reference.

TECHNICAL FIELD

This relates generally to display assistant devices that detect changes in a sleep environment of a user, compute sleep quality statistics, and actively assist a user to improve sleep quality.

BACKGROUND

Environmental factors, such as ambient temperature, lighting, and sound, can impact a person's sleep quality. Analyses that only consider a person's physiological parameters (e.g., heart rate, respiration rate, and body motion) do not provide a complete picture for assessing sleep quality. Wearable devices (e.g., a watch) that measure physiological parameters may also be heavily influenced by the person's body temperature, and thus may not be reliable in terms of capturing an ambient temperature that may influence the person's sleep.

SUMMARY

This application describes systems and methods for monitoring sleep quality. In some implementations, all of the needed functions and hardware for monitoring sleep quality are provided in a display assistant device that can be positioned near a user's bed. The display assistant device uses sensors to sense ambient and user signals related to user sleep quality. From the sensed ambient and user signals, the display assistant device determines sleep quality and sleep phases, identifies sleep disturbances and, optionally, initiates actions to mitigate sleep disturbances by controlling connected devices and using audio and visual outputs of the display assistant device. The display assistant device also computes sleep quality statistics and displays, upon the user's waking from a sleep session or on demand, a sleep quality summary that provides the sleep quality statistics and identifies the sleep disturbances. In some implementations, the display assistant device allows the user to play back events identified as sleep disturbances. Because all or most operations are performed locally on the display assistant device, personal information of the user is protected and the need for server interaction is reduced. Further, the display assistant device does not have a camera so as to protect the privacy of the user in view of the display assistant device being intended for use in the user's bedroom and during sleep.

In one aspect, some implementations include a display assistant device with one or more processors, a microphone, a motion sensor, one or more ambient sensors, a display, and memory having instructions stored thereon, which when executed by the one or more processors, cause the processors to perform one or more sleep monitoring functions.

During a sleep session of a user of the display assistant device, the display assistant device records sound, movement, and ambient conditions, such as a light level, in proximity to the display assistant device. The display assistant device analyzes the recorded sound and the recorded movement to identify throughout the sleep session of the user a time-varying sleep state of the user. The sleep state is characterized by a sleep quality and a sleep phase.

In some implementations, the sleep quality is a single value (e.g., a number between 1 and 100) determined by the display assistant device for a plurality of moments during the sleep session that captures how well, based on user and ambient measurements, the user is sleeping. In some implementations, the sleep phase is determined based on user biometric measurements performed by on-board sensors built into the display assistant device and, optionally, other sensors, such as wearable sensors. In some implementations, the sleep phase is one of: awake, rapid eye movement (REM), light sleep, deep sleep, or waking. In some implementations, a single sleep session quality value is determined for the sleep session by the display assistant device from the plurality of sleep quality values. The display assistant device also analyzes the recorded ambient conditions and the recorded sound throughout the sleep session, to identify time-varying sleep disturbances occurring during the sleep session of the user. After the sleep session of the user has concluded, the display assistant device presents on the display screen a summary of the sleep session. In some implementations, the sleep summary includes visual indications of the sleep quality and disturbances identified throughout the sleep session.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

This disclosure describes systems and methods for tracking sleep quality using a display assistant device that includes sensors. The display assistant device records events (e.g., sounds, movement, and/or ambient conditions) in proximity to the display assistant device during a sleep session of a user. From the recorded events, the display assistant device determines a user sleep state and identifies sleep disturbances. The display assistant device also controls a user interface of the display assistant device based on the user state. For example, the display device can display ambient information relevant to sleep quality when the user is in bed prior to going to sleep, can display a summary of sleep quality and disturbances when a user is waking up after a sleep session, and can replay audio and video of sleep disturbances as requested by the user. The display assistant device can also control output of other connected devices to mitigate sleep disturbances.

Figure 1:
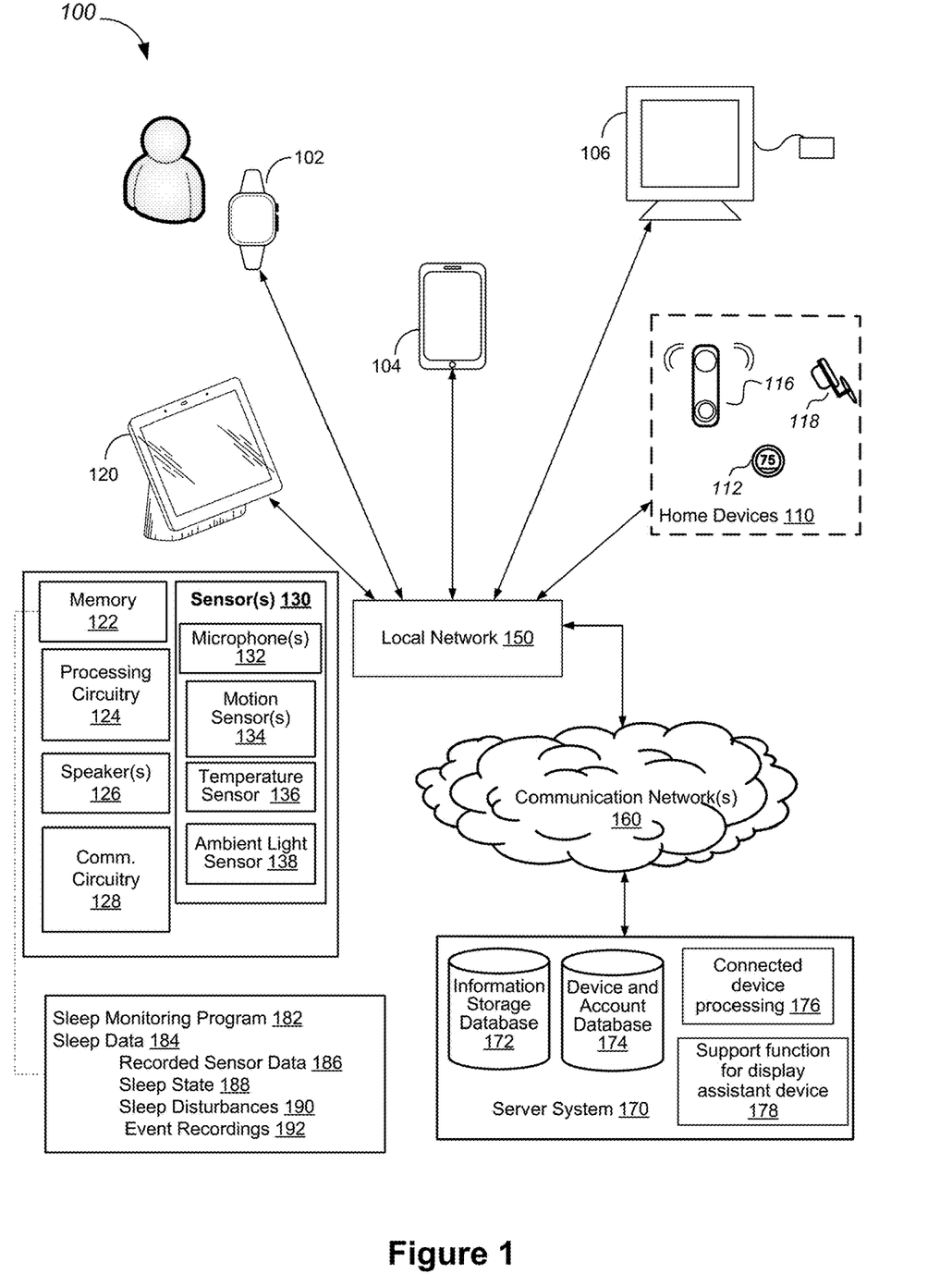
FIG. 1 is an example home environment connected to a remote server system, in which a user state is monitored by a display assistant device, in accordance with some implementations.

FIG. 1 is an example home environment 100 connected to a remote server system 170, in which a user state (particularly, a sleep state) is monitored by a display assistant device 120 in accordance with some implementations. The home environment 100 includes various devices (also referred to herein as "connected" or "integrated" devices) that are interconnected via a local network 150. In some implementations, the devices include the display assistant device 120 and one or more of: a wearable device 102 (e.g., a smart watch) that is worn by a user of the home environment 100, a mobile device 104, a media output device 106, and home devices 110. In some implementations, the home devices 110 include one or more of: a thermostat 112, a connected doorbell/camera 116, and a camera 118. The thermostat 112 detects ambient climate characteristics (e.g., temperature and/or humidity) and controls a heating, ventilation, and air conditioning (HVAC) system (not shown) of the home environment 100 accordingly. The connected doorbell/camera 116 alerts the user to the presence of people and/or packages at the front door and monitors activity at the front door. The camera 118 may be part of a home security system that allows the user to track activity around the home environment 100.

By virtue of network connectivity, a user may control the connected devices in the home environment 100 even if the user is not proximate to the devices. As one example, the user may use the display assistant device 120 to view or adjust a current set point temperature of the thermostat 112 (e.g., via the local network 150 and through a communication circuitry 128 of the display assistant device 120). In some implementations, the display assistant device 120 includes program modules that can control the home devices 110 without user interaction. For example, as described below, program modules installed on the display assistant device 120 can control the home devices 110 before a user goes to sleep, or while the user is sleeping, to provide ideal sleep conditions (e.g., by controlling temperature, light and sound levels proximate to the user via the home devices 110) and/or to mitigate sleep disturbances.

As another example, the camera 118 may store video data locally and wirelessly stream video data to the mobile device 104 or the display assistant device 120 via communication network(s) 160 and/or the local network 150.

In some implementations, at least a subset of the connected devices are also communicatively coupled to a server system 170 through communication network(s) 160. The server system 170 includes one or more of: an information storage database 172, a device and account database 174, a connected device processing module 176, and a support function for display assistant device module 178. For example, the camera 118 may stream video data to the server system 170 via the communication network(s) 160 for storage on the server system 170 (e.g., the information storage database 172) or for additional processing by the server system 170. The user may access the stored video data using the mobile device 104 (or the display assistant device) via the communication network(s) 160.

In some implementations, the user establishes a user account (e.g., a Google™ user account) with the server system 170 and associates (e.g., adds and/or links) one or more connected devices with the user account. The server system 170 stores information for the user account and associated devices in the device and account database 174.

The server system 170 enables the user to control and monitor information from the connected home devices 110 via the connected device processing module 176 (e.g., using an application executing on the mobile device 104 or assistant capabilities of some of the home devices 110). The user can also link the display assistant device 120 to one or more of the connected home devices 110 via the user account. This allows program modules executing on the display assistant device 120 (e.g., a sleep monitoring program 182) to receive sensor data and other information collected by the home devices 110 via the server system 170, or send commands via the server system 170 to the home devices 110.

In some implementations, the display assistant device 120 includes memory 122, processing circuitry 124, speaker(s) 126, communication circuitry 128 (e.g., network interface(s)), and sensor(s) 130. The memory 122 stores programs that, when executed by elements of the processing circuitry 124, perform one or more of the functions described with reference to FIGS. 1 to 5. For example, in some implementations, the stored programs include a sleep monitoring program 182 that collects and analyzes sensor data, determines a user's sleep state during a sleep session, controls the presentation of sleep data and/or sensor data on a display screen of the display assistant device 120, and/or controls connected home devices 110 to mitigate sleep disturbances or to otherwise control and enhance the sleep environment. In some implementations, the memory 122 also stores sleep data 184 from one or more user sleep sessions, including for a particular sleep session: recorded sensor data 186, data related to the user's sleep state 188 and sleep disturbances 190, and audio and/or video recordings of events (e.g., disturbances) that occurred during the sleep session (e.g., loud noises or bright light levels that were recorded in proximity to the display assistant device).

The sensor(s) 130 are integrated into the display assistant device 120, and include one or more of: microphone(s) 132, motion sensor(s) 134, a temperature sensor 136, and an ambient light sensor 138. The sensor(s) 130 detect and record sound, movement, and/or ambient conditions (e.g., temperature and light level) in proximity to the display assistant device 120. As used herein, "sound, movement, and/or ambient conditions" are referred to collectively as "events" or "signals." Recorded sound, movement, and/or ambient conditions are also collectively known as "recorded events" or "recorded signals". Each of the recorded events is associated with a respective date stamp and timestamp. In some implementations, the recorded events are stored (e.g., as event recordings 192) and processed locally (e.g., by the sleep monitoring program 182) on the display assistant device 120. In some implementations, the display assistant device 120 sends at least a subset of the recorded events to the server system 170 (e.g., to the support function for display assistant device module 178) via the communication network(s) 160 for storage and processing.

In some implementations, the motion sensor(s) 134 includes one or more of: an ultrasonic sensor, a presence sensor, an infrared (IR) sensor (e.g., a passive infrared, or PIR sensor), a time of flight sensor, a RAdio Detection And Ranging (RADAR) sensor, and a Light Detection And Ranging (LiDAR) sensor. In some implementations, the display assistant device 120 may include a plurality of different motion sensors 134 of identical or different types for detecting and recording different motion types, such as gross and fine motions. For example, gross motions of the user may include the user sitting up, walking in the room, getting into or out of bed, and/or turning in bed. Fine motions of the user may include slight (or minimal) movement of the user's body, such as movements associated with user respiration (e.g., breathing) or periodic limb movements while the user is asleep. In some implementations, the recorded gross and fine motions of the user may be used to determine a sleep state of the user.

In accordance with some implementations, the display assistant device 120 is disposed in a room of the home environment 100 (e.g., in a bedroom) and is used for determining sleep quality of a user (e.g., via the sleep monitoring program 182). During a sleep session of the user, the display assistant device 120 records events in proximity to the display assistant device 120 using the sensor(s) 130. The display assistant device 120 analyzes the event recordings 192 to identify (e.g., determine) a varying sleep state of the user. The display assistant device 120 also identifies sleep disturbances occurring during the sleep session and mitigates the sleep disturbances. The display assistant device 120 further computes sleep statistics. At the end of the sleep session (e.g., when the user wakes up), the display assistant device 120 displays a sleep summary of the sleep session.

In some implementations, the display assistant device 120 (e.g., the processing circuitry 124) determines whether a sleep session of the user is taking place (e.g., whether the user is sleeping) by monitoring one or more signals, including a time of day, user selection of a particular operation mode (e.g., a sleep mode or a "do not disturb" mode) on the display assistant device 120, and/or signals detected using the sensor(s) 130. For example, the processing circuitry 124 may determine that a sleep session is in progress because the signals from the ambient light sensor 138 indicate that the bedroom is dark, little or no sound is picked up from the microphone(s) 132, and/or signals from the motion sensor(s) 134 (e.g., a radar sensor) suggest that the user is breathing slowly.

In accordance with a determination that a sleep session is in progress, the processing circuitry 124 (e.g., executing the sleep monitoring program 182) records sound (e.g., using microphone(s) 132) in proximity to the display assistant device 120. Sound includes both ambient sound and user sound. The processing circuitry 124 also records movement (e.g., using motion sensor(s) 134) and ambient conditions (e.g., using temperature sensor 136 and ambient light sensor 138) in proximity to the display assistant device 120. The ambient conditions include a light level and/or temperature.

In some implementations, after recording the sound, movement, and ambient conditions in proximity to the display assistant device 120, the processing circuitry 124 executing the sleep monitoring program 182 analyzes the recorded sound and movement to identify, throughout the sleep session of the user, a time-varying sleep state of the user. The sleep state of the user may include one of: an asleep state, an in-bed state, and a movement state. The asleep state refers to when the user is sleeping. The in-bed state is when the user is in bed (and either sleeping or not sleeping). The movement state refers to when the user is moving, such as moving while asleep in bed, moving while awake in bed, and/or moving while awake and not in bed. For example, the processing circuitry 124 may determine that the user is in the asleep state because of minimal or no sound detected by the microphone(s) 132, and/or because the microphone(s) 132 detected sounds that are consistent with the user snoring or breathing deeply. The processing circuitry 124 may also determine that the user is in the asleep state based on no motion, low level of fine motions, or extended low levels of motion detected by the motion sensor(s) 134. The processing circuitry 124 may distinguish the asleep state from the in-bed state based on increased fine motion from the user while awake as compared to while asleep (e.g., increased movement due to higher heart rate from being awake and/or from blinking). In some implementations, the display assistant device 120 (e.g., the processing circuitry 124) is configured to identify periodically (e.g., every 5 minutes, 10 minutes, or 20 minutes) the sleep state of the user. In some implementations, the sleep data 184 stored in the memory 122 (or at the server system 170) is associated/stored with a timestamp to allow detailed time-based analysis and presentation to the user of the sleep data 184, identification of correlations between sleep state 188 and sleep events (e.g., disturbances 190), and opportunities for pre-emptive (e.g., prior to a sleep session) or real-time mitigation by the display assistant device 120 of sleep disturbances.

In some implementations, the sleep state is characterized by a sleep quality and a sleep phase. The phases of sleep (e.g., sleep phases or sleep stages) are well-known in the art and are associated with either non-rapid eye movement (NREM) sleep or rapid eye movement (REM) sleep. These phases are characterized by physiological differences that can be detected by the sensor(s) 130 and recognized by the sleep monitoring program 182.

The awake phase (i.e., phase one) comes between being awake and falling asleep at the beginning of a sleep session. Sometimes, when the awake phase occurs at the end of the sleep session, it is referred to as an "awakening" phase. The light sleep phase (e.g., phase two) initiates a sleep cycle and acts as a transition to deeper NREM sleep phases (phases three and four). In the deep sleep phases, the person's blood pressure drops and there is increased blood flow to the muscles. During REM sleep (phase REM), which occurs between the awake and NREM sleep phases, the user's respiration and heart rate increases, and the body becomes temporarily paralyzed as the user dreams. Together, the NREM and REM categories of sleep make up a single sleep cycle in which the brain progresses from awake to REM to light sleep to deep sleep (sometimes omitting deep sleep). The cycle then repeats across a user sleep session (e.g., the entire night) with some variation. For example, as a sleep session progresses, a user typically spends less time in the deep sleep phases three and more time in REM sleep.

In some implementations, as described with reference to FIGS. 4B-4C, the display assistant device 120 (e.g., the processing circuitry 124 operating under control of the sleep monitoring program 182) can identify time-varying changes in the user's sleep state throughout a sleep session (e.g., changes between awake, light sleep, deep sleep, and/or REM phases). For example, the processing circuitry 124 may correlate fine motions and sounds of the user that are recorded over time with available sleep phase models, to further identify a corresponding sleep phase. In some implementations, the display assistant device 120 also displays appropriate sleep information to the user based on the user's current sleep phase, as described in greater detail with respect to FIGS. 3A-3B and 4A-4D.

In some implementations, the sleep state is further characterized by a sleep quality. Sleep quality refers how well a person sleeps. Indicators (e.g., determinants) of sleep quality can include: an amount of time it takes to fall asleep, time spent sleeping while in bed, waking up during the night, and an amount of time to drift back to sleep if the person does wake up. Indicators of sleep quality can also include disturbances to sleep, such as: moving while in bed, changes in ambient light conditions (e.g., room light on/off), user-made sounds (e.g., snoring or coughing) ambient sounds (e.g., sounds from user devices such as cell phone message reminders and sounds from the media output device 106, baby crying in the background, passing vehicles), and/or changes in ambient temperature conditions (e.g., temperature too high/low).

In some implementations, the display assistant device 120 (e.g., the processing circuitry 124) may be configured to identify the sleep state of the user by quantitatively characterizing the sleep quality within a predefined sleep quality range. For example, the processing circuitry 124 may be configured to identify, based on analysis of the recorded events throughout the sleep session, a plurality of time-varying sleep disturbances occurring during the sleep session of the user. In some implementations, the display assistant device 120 is also configured to identify disturbance types using machine learning techniques.

In some implementations, the processing circuitry 124 repeatedly performs the steps of determining sleep phases, recording events, and analyzing the recorded events throughout the sleep session of the user. In some implementations, the processing circuitry 124 may also determine the beginning, end, and transitions within a sleep session, such as when the user goes to bed, first falls asleep after going to bed, briefly awakens and falls back asleep, and wakes for good in the morning at the end of the sleep session.

Further, in some implementations, the processing circuitry 124 executing the sleep monitoring program 182 is configured to, based on the recorded events, identify sleep disruptions and initiate one or more mitigation operations to improve the sleep environment and promote the sleep quality of the user of the display assistant device. For example, during a sleep session of the user, the display assistant device 120 may identify based on analysis of recorded sound occurrences of noisy disturbance events (e.g. user-made noise and/or ambient noise) in proximity to the display assistant device 120. In accordance with a determination that the occurrences of noisy disturbance events and the associated sleep phase meet predefined noise masking criteria, the display assistant device 120 may initiate mitigation (e.g., protection) of the user's sleep by generating and outputting (e.g., via the speaker(s) 126) white noise for masking upcoming noisy disturbance events. The white noise may include a range of frequencies (e.g., 20 Hz-20 kHz), an intensity (e.g., 40 dB), and/or a predetermined time duration (e.g., 30 minutes). In some implementations, the white noise may be generated in the light sleep stages of a sleep phase to promote the user falling asleep. In some implementations, the parameters of the white noise are dynamically adjusted based on the noise events and the sleep phase.

In some implementations, the display assistant device 120 mitigates (e.g., counteracts) sleep disturbances by controlling other connected devices in the home environment 100. For example, during the sleep session of the user, the sleep monitoring program 182 may determine in real time, based on the recorded ambient signals and/or recorded sound for each of the identified disturbances, a likely disturbance type, which may be one or more of: a sound-based, an ambient light-based, a temperature-based, and/or humidity-based disturbance type. Based on the likely disturbance type and availability of connected home devices in proximity to the display assistant device 120, the display assistant device 120 may control one or more of the connected home devices (e.g., the home devices 110) to actively counteract, in real time, the identified disturbances. Control of the connected device is preferably performed locally by the display assistant device 120 (e.g., via the local network 150) to protect user privacy. In some implementations, the display assistant device 120 may control the connected device via the server system 170, by sending a command for active mitigation (e.g., noise, light, temperature, and/or humidity mitigation) to the server system 170 (e.g., the connected device processing module 176), which in turn issues a command to the affected device to change output.

In some instances, the connected home devices 110 include a thermostat device (e.g., the thermostat 112). During the sleep session of the user, the display assistant device 120 obtains (e.g., determines) an ambient temperature of an environment where the display assistant device 120 is disposed (e.g., using the temperature sensor 136). In accordance with a determination that the ambient temperature is out of a predefined temperature range (e.g., an optimum temperature range that promotes sleep), the display assistant device 120 determines that the likely disturbance type to be a temperature-based disturbance type. In accordance with a determination of the temperature-based disturbance type and an availability of the thermostat 112, the display assistant device 120 sends an instruction to the thermostat 112 to adjust the ambient temperature to the predefined temperature range to protect the user state.

In another instance, the connected home devices include networked blinds. During the sleep session of the user, the display assistant device 120 determines a light level of the environment where the display assistant device 120 is disposed (e.g., using the ambient light sensor 138). In accordance with a determination that the light level is beyond a threshold level, the display assistant device 120 determines that there is a light-based disturbance type, and sends an instruction to the networked blinds to adjust the light level (e.g., by lowering and/or closing the blinds).

In some implementations, the processing circuitry 124 executing the sleep monitoring program 182 is configured to determine a sleep phase of the user during the sleep session and present the sleep summary to the user when the sleep phase is an awakening sleep phase (e.g., the user is awake in bed at the end of the sleep session). For example, the processing circuitry 124 may transition the display assistant device 120 for operation during a non-sleep session of the user, and presents (e.g., displays) on the display screen 204 of the display assistant device 120 a sleep summary (e.g., a visual summary) of the user's sleep session. As will be described further with respect to FIGS. 4A to 4C, the sleep summary may include visual indications of the sleep quality and disturbances that were identified throughout the sleep session. The sleep summary is typically displayed after the user wakes up.

In some implementations, the processing circuitry 124 displays the sleep summary on the display assistant device 120 after detecting that the user is awake in bed (e.g., from respiration, sound and/or motion signal(s) detected by the motion sensor(s) 134). In some implementations, the processing circuitry 124 may determine that the user is no longer in bed (e.g., from respiration signal(s) from the motion sensor(s) 134) and as a result, may send the sleep summary to the user (e.g., to the mobile device 104 via the local network 150). In some implementations, the processing circuitry 124 is also configured to gradually increase a brightness level and/or vary a color of the display screen 204 (e.g., from soothing to energizing) to slowly awaken the user after determining that the user is in the awake phase.

In some implementations, the display assistant device 120 is communicatively coupled to one or more connected home devices 110, and a subset of the movement or ambient conditions in proximity to the display assistant device 120 is recorded via the one or more connected home devices 110 to further aid tracking the user's sleep quality. For example, the display assistant device 120 is communicatively coupled to the thermostat 112, and the humidity of the home environment 100 is measured by the thermostat 112 and transmitted to the display assistant device 120. In another example, the user may wear a connected watch (e.g., the wearable device 102) that tracks physiological parameters of the user (e.g., heart rate, blood pressure, and body temperature) during sleep. The wearable device 102 may send the tracked physiological parameters to the display assistant device 120, which will analyze the tracked physiological parameters in combination the events recorded by itself to determine the user's sleep quality. In some implementations, data recorded by the one or more connected devices 110 or wearable device 102 is transmitted directly to the display assistant device 120 via the local network 150 without going through the server system 170, thereby reducing a need for server interaction and ensuring privacy of personal information.

In some implementations, the sleep quality is a single value (e.g., a number between 1 and 100) determined by the display assistant device for a plurality of moments during the sleep session that captures how well, based on user and ambient measurements, the user is sleeping. Alternatively, the sleep quality is qualitatively or quantitatively presented by a visual representation, e.g., in GUIs 400, 410 and 430 in FIGS. 4A-4C. In some implementations, a single overall sleep session quality value is determined for the entire sleep session by the display assistant device 120 from a plurality of the sleep quality values determined during the sleep session.

Having described components and operations of the sleep monitoring system and environment of FIG. 1, further details of the display assistant device 120 are now described with reference to FIGS. 2A and 2B.

Figure 2A:
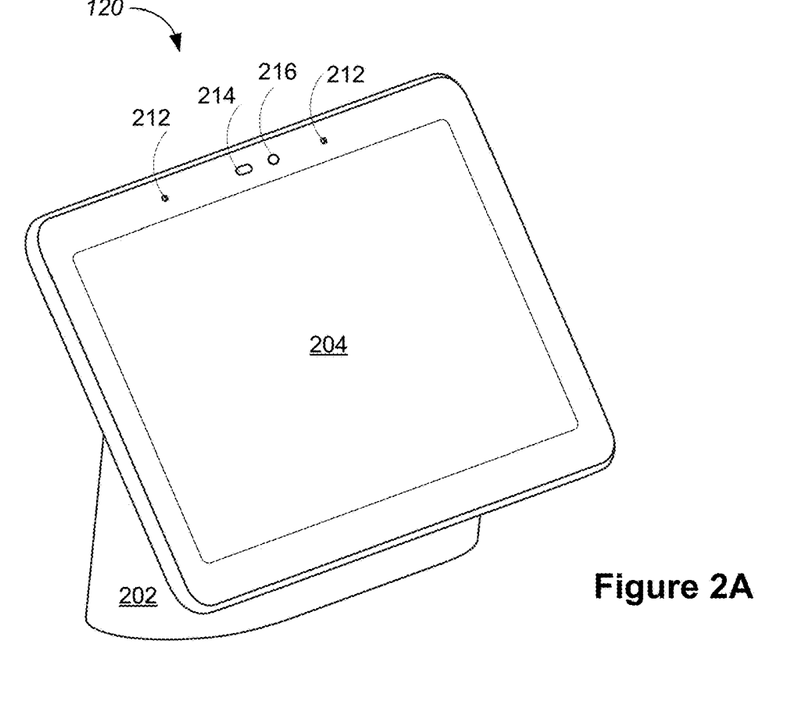
FIGS. 2A and 2B are, respectively, a perspective view and a front view of a display assistant device in accordance with some implementations.
Figure 2B:
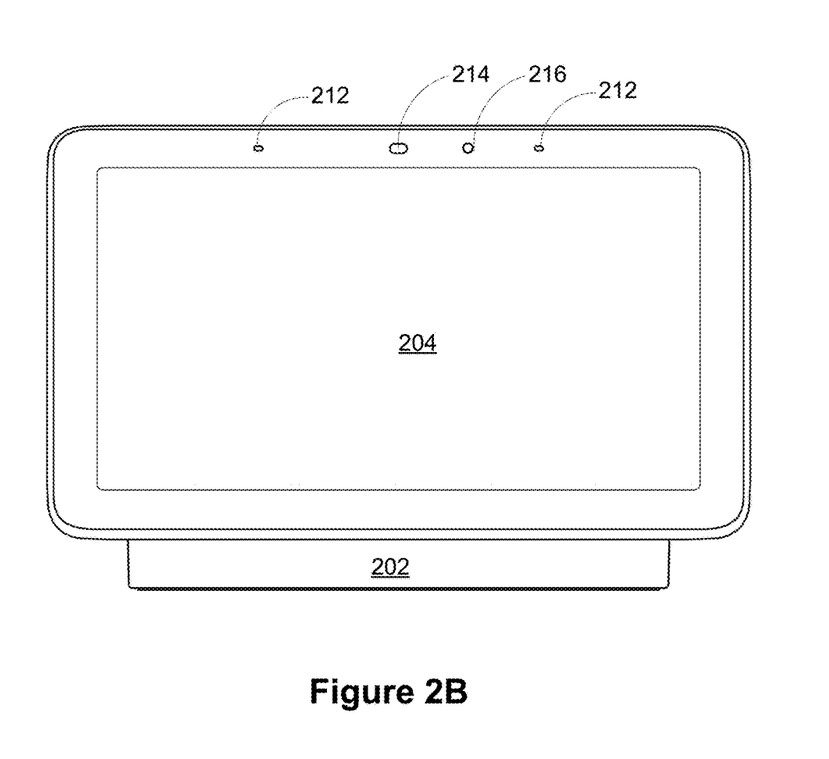

FIGS. 2A and 2B illustrate, respectively, a perspective view and a front view of the display assistant device 120 in accordance with some implementations. The display assistant device 120 is a standalone, free-standing device. In some implementations, the display assistant device 120 includes a base 202 and a display screen 204. In some implementations, the base 202 acts a speaker box. Stated another way, the base 202 can also provide an enclosure for the speaker(s) 126. In some implementations, the speaker(s) 126 include a front speaker and/or a back speaker.

In some implementations, and as illustrated in FIGS. 2A and 2B, the display assistant device 120 has a bezel area surrounding an active display area of the display screen 204. In some implementations, the bezel area includes one or more microphone holes 212, one or more sensor openings 214, and an indicator window 216. The microphone(s) 132 are placed behind the microphone holes 212 and collect sound (e.g., including both sound made by a user and ambient sound) in proximity to the display assistant device 120. In some implementations, the display assistant device 120 functions as a voice assistant device and the microphone(s) 132 collect audio inputs for initiating various media play functions of the display assistant device 120 and/or the media output device 106, or controlling various home devices 110 disposed in the home environment 100.

In some implementations, the sensor opening 214 exposes the motion sensor(s) 134, which records movement in proximity to the display assistant device 120. In some implementations, the motion sensor(s) 134 are configured to detect and record gross and fine motions of the user of the display assistant device 120, as discussed with respect to FIG. 1.

In some implementations, the sensor opening 214 exposes one or more ambient sensors (e.g., the temperature sensor 136 and the ambient light sensor 138) that monitor and record ambient conditions (e.g., temperature and light level) in proximity to the display assistant device 120. In some implementations, the display assistant device includes multiple sensor openings 214, and each sensor opening 214 exposes one of the sensor(s) 130 with which the display assistant device 120 is equipped.

As further illustrated in FIGS. 2A and 2B, the display assistant device 120 includes an indicator window 216 behind which an indicator may be disposed. In some implementations, the indicator provides a sequential lighting pattern to indicate whether the display assistant device 120 is active or inactive, whether the microphone(s) and/or speaker(s) of the display assistant device 120 are muted or not, and/or a processing state (e.g., detecting, recording, analyzing, displaying, and/or speaking).

The display assistant device 120 does not have a camera so as to protect the privacy of the user in view of the display assistant device 120 being intended for use in the user's bedroom and during sleep.

In some implementations, the display assistant device 120 is a multifunctional device whose functions include, but are not limited to, displaying photos, presenting media content, showing a date and a time, setting an alarm, and generating white noise to mitigate sleep disturbances.

In accordance with some implementations, the processing circuitry 124 is configured to control an output of the display assistant device 120 based on the sleep state of the user. In particular, FIGS. 3A and 3B illustrate two example graphical user interfaces (GUIs) 300 and 350 displayed on a display assistant device 120 at the start of a sleep session of a user, in accordance with some implementations.

Figure 3A:
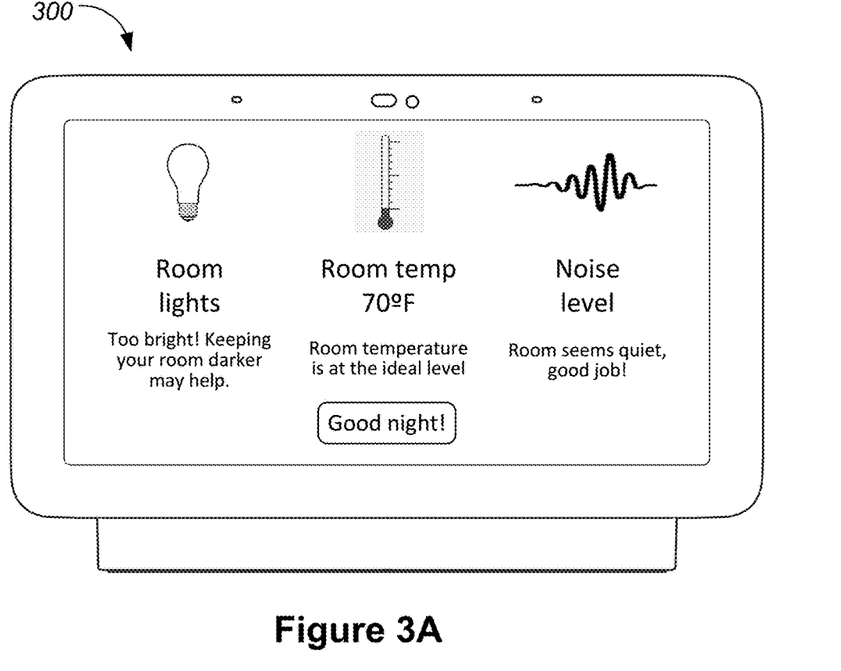
FIGS. 3A and 3B illustrate two example graphical user interfaces (GUIs) displayed on a display assistant device at the start of a sleep session, in accordance with some implementations.

Referring to FIG. 3A, in some implementations, upon determining that the user is about to go to sleep, the display assistant device 120 displays the GUI 300, which shows current ambient conditions and provides affordances to allow the user to change one or more of the displayed conditions to promote improved sleep quality. In some implementations, as shown on FIG. 3A, the displayed ambient conditions include light level, room temperature, and noise level. Alternative ambient conditions monitored by a home device can also be displayed, and examples of the alternative ambient conditions include, but are not limited to, whether a door is locked, a switch state of a light, a status of a surveillance camera, and/or alarm settings of an alarm clock. In some implementations, the displayed GUI 300 indicates whether each of the displayed ambient conditions is at a level that is conductive to good sleep or recommended to be changed. For example, referring to FIG. 3A, the display assistant device 120 indicates that the determined light level is too bright and that the room temperature (70 degrees Fahrenheit) and noise levels (quiet) are ideal. If any of the ambient conditions is not ideal, the user can correct those conditions using capabilities of the display assistant device 120 to control the relevant connected devices via affordances (visual and/or verbal) provided by the display assistant device 120. For example, the user can interact with affordances associated with the light level, room temperature or noise level shown on the GUI 300, or issue a voice command that is received and processed by the display assistant device 120 to change the condition(s) that is not ideal. Referring to FIG. 3A, the user can correct the too bright light condition shown there by touching the light bulb icon and then setting the room brightness to the desired level (not shown), which request is implemented by one of the connected lighting devices in the room via either direct local network connections with the display assistant device 120 (e.g., the local network 150) or via the server system 170. In some implementations, the user can also ask the display assistant device 120 to simply correct the sleep environment; this request can be implemented by the sleep monitoring program 182 in conjunction with the aforementioned capabilities of the display assistant device 120 to control connected devices associated with the less than ideal sleep conditions.

The display assistant device 120 can employ one or more methods to determine that the user is about to go to sleep. For example, the display assistant device 120 (e.g., under control of the sleep monitoring program 182) can determine from prior days' ambient and user measurements a time of day when the user typically goes to bed; can determine from sensor measurements that the user has just gotten into bed; and/or can determine based on a user input (e.g., from a user voice input or the user selecting a affordance (not shown) on the display) that the user is ready to go to sleep.

Figure 3B:
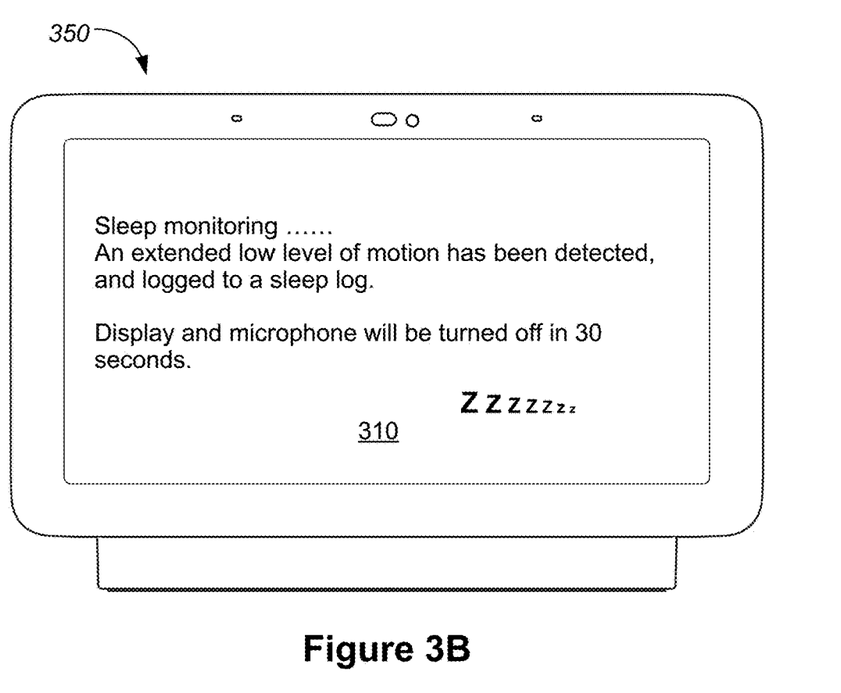

Referring to FIG. 3B, in accordance with a determination of the user state is the asleep state, the display assistant device 120 may also display appropriate sleep information based on the user's current sleep phase, such as an output 310 that includes the message "Sleep monitoring . . . . An extended low level of motion has been detected, and logged to a sleep log." The output 310 may further comprise an upcoming change in the settings of the display assistant device 120 (e.g., "Display and microphone will be turned off in 30 seconds").

In some implementations, the displayed output 310 is determined according to user interface settings, which may include one or more of: an output content, an output format, a brightness level, a contrast level, and a speaker volume associated with the output of the display assistant device 120. In some implementations, and as illustrated in FIG. 3B, in accordance with a determination of the user sleep state (e.g., the user is in the asleep state), the display assistant device 120 may be configured to turn off the display screen 204 and the speaker(s) 126, as these components are not likely used while the user is asleep. The powering down of the display screen 204 and the speaker(s) 126 also promotes sleep by reducing ambient light and noise contributions while the user is asleep.

In contrast, the processing circuitry 124 may also be configured to, in accordance with a determination that the user is in asleep state for 8 hours, output signals to stimulate wake up, such as increasing a light level in the room, playing music etc. The processing circuitry 124 may further be configured to, in accordance with a determination that the user is in the in-bed state, turn off the display screen 204 and output a sequence of relaxing melodies via the speaker(s) 126 using a speaker volume associated with the in-bed state.

In some implementations and as described earlier with respect to FIG. 1, the display assistant device 120 is configured to actively protect the sleep environment of the user during the sleep session, by identifying sleep disturbances (e.g., disruptions), such as sound and other ambient disturbances, and mitigating the disturbances.

In some implementations, and as described previously with respect to FIG. 1, the processing circuitry 124 executing the sleep monitoring program 182 is configured to present the sleep summary to the user after the sleep session of the user has concluded (e.g., in accordance with a determination that the user is in the awakening sleep phase). FIGS. 4A to 4D are example visual summaries that may be displayed on the display assistant device 120 in accordance with some implementations.

Figure 4A:
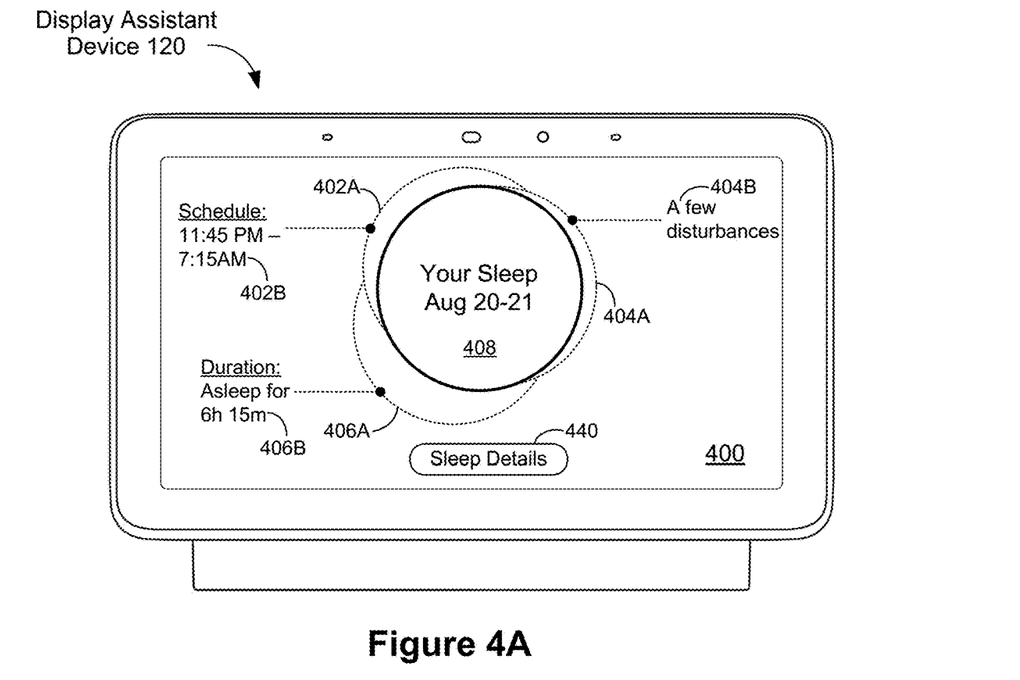
FIG. 4A illustrates a visual summary of a sleep session displayed on a display assistant device, in accordance with some implementations.

FIG. 4A illustrates a visual summary 400 of a sleep session displayed on a display assistant device 120, in accordance with some implementations. The visual summary 400 visualizes a sleep quality of the sleep session determined based on a plurality of sleep-related parameters, each of which indicates an aspect of sleep. Examples of the sleep-related parameters include, but are not limited to, a sleep schedule, a disturbance level, and a sleep duration. In these implementations shown in FIG. 4A, the sleep schedule, disturbance level, and sleep duration are represented by three circles 402A, 404A, and 406A, respectively. These three circles 402A, 404A, and 406A are displayed with respect to a center region 408 that is at least partially overlapped with the circles and marked with a textual affordance; e.g., "Your sleep August 20-21" indicating a date of the sleep session. In some implementations, the visual summary 400 further includes an actionable affordance 440 linked to a comprehensive visual summary (e.g., visual summaries 410 and 430 in FIGS. 4B and 4C). In response to a user action on the actionable affordance 440, the comprehensive visual summary may be displayed in place of the visual summary 400 on the display assistant device 120.

Each of the three circles 402A, 404A, and 406A is optionally associated with a respective one of three textual affordances 402B, 404B, and 406B, and provides additional information concerning a corresponding sleep-related parameter of the sleep session. For example, the textual affordance 402B indicates that the sleep schedule is 11:45 PM-7:15 AM on the night of August 20, and the textual affordance 406B indicates that the sleep duration is 6 hours and 15 minutes. The textual affordance 404B indicates that the sleep session has "a few disturbances." Alternatively, the textual affordance 404B may provide alternative information concerning the disturbances, e.g., disturbance source and/or intensity.

In some implementations, the sleep quality is a combination of the plurality of sleep-related parameters and visually corresponds to alignment of the circles 402A, 404A, and 406A. Offsets of the circles 402A, 404A, and 406A from the center region 408 visually indicate whether the sleep schedule, disturbance level, and sleep duration are good. For example, the offset of the circle 404B is relatively large with respect to the center region 408 (e.g., exceeds a predetermined threshold portion of the center region 408), which indicates the sleep duration is not good and can be improved. In some situations, the circles 402A, 404A, and 406A entirely overlap the center region 408, thereby indicating that the sleep quality is at a desired level.

Figure 4B:
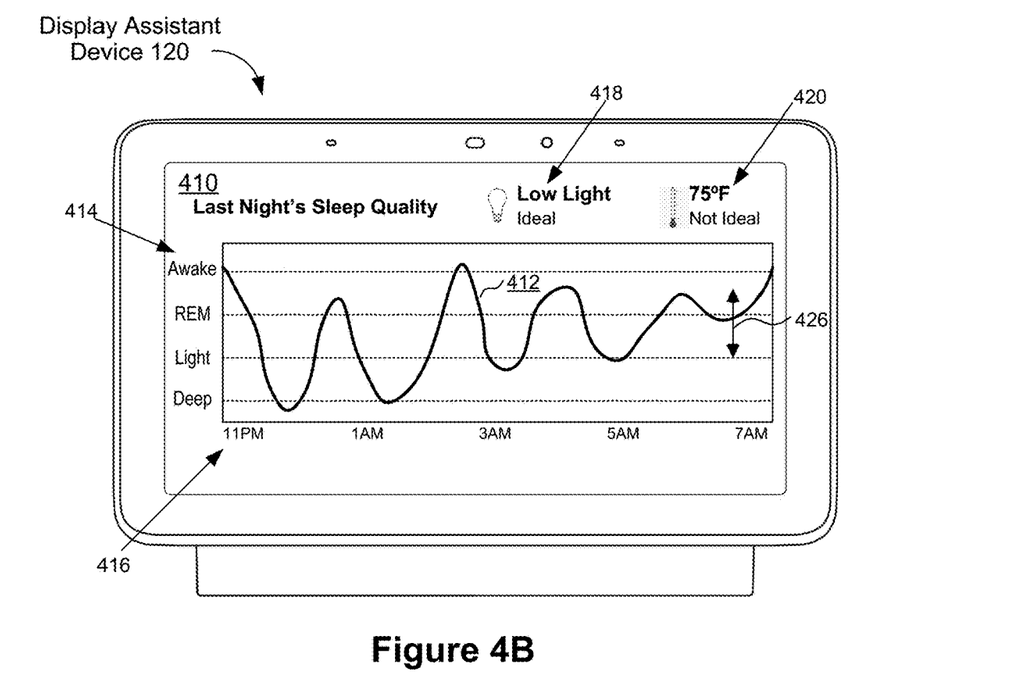
FIGS. 4B and 4C illustrate two example visual summaries of a sleep session displayed on a display assistant device at the end of the sleep session.

FIG. 4B illustrates another visual summary 410 of a sleep session displayed on a display assistant device 120 in accordance with some implementations. The visual summary 410 includes a graph 412 (e.g., a plot) of sleep phases "Awake" (e.g., awakening), "REM", "Light" and "Deep" on the vertical axis 414 and time on the horizontal axis 416. The graph 412 depicts how the sleep phases of the user change as a function of time during the sleep session. The visual summary 410 also includes the ambient light condition 418 (e.g., the ambient light sensor 138) and the ambient temperature condition 420 (e.g., the temperature sensor 318) that were recorded during the sleep session. The visual summary 410 may also provide indication(s) (e.g., "low light—ideal" and "75° F.— Not ideal") as to whether the ambient conditions are conducive for sleep.

In some implementations, the visual summary 410 also includes an interactive slider 426 that enables the user to "scrub through" the graph 412 to reveal finer-grained details about the sleep session. For example, the user may identify, for a given time during sleep session, disturbances that may have occurred at particular times during the sleep session and affected sleep quality.

Figure 4C:
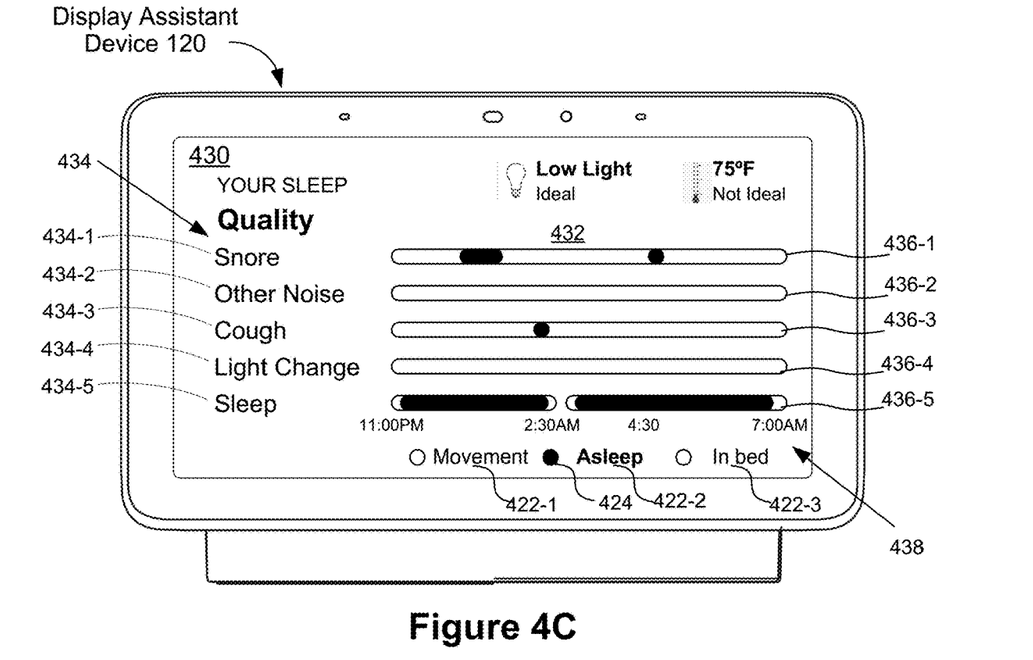

FIG. 4C illustrates a visual summary 430 of a sleep session displayed on a display assistant device 120 at the end of the sleep session in accordance with some implementations. The visual summary 430 includes a bar chart 432 of sleep disturbances 434 (e.g., "Snore" 434-1, "Other Noise" 434-2, "Cough" 434-3, and "Light Change" 434-4) on the vertical axis and time 438 on the horizontal axis. The bar chart 432 includes a plurality of data bars 436, each corresponding to one of the sleep disturbances 434. The data bars 436 depict the sleep disturbances 434 as a function of time 438 throughout the sleep session and also identifies occurrences of the identified disturbances 434. For example, the data bar 436-1 corresponding to the sleep disturbance "Snore" 434-1 shows that snoring occurred during the sleep session at ~12:30 AM to 1:30 AM and at ~4:45 AM to 5:00 AM. The data bar 436-2 corresponding to the sleep disturbance "Other Noise" 434-2 shows that no other noise was detected during the sleep session. Optionally, a cough level associated with "Cough" 434-3 and a light change level associated with "Light Change" 434-4 are monitored quantitatively indicated on two data bars 436-3 and 436-4 as well. In some implementations, the bar chart 432 also includes a data bar 436-5 corresponding to "Sleep" 434-5. In the example of FIG. 4B, sleep occurred shortly after 11:00 PM to ~2:15 AM, and from ~3:00 AM to before 7:00 AM.

The visual summary 430 may also include identifiers 422 corresponding to the various user sleep states ("Movement" 422-1, "Asleep" 422-2, and "In bed" 422-3), and an indicator 424 identifying the user sleep state to which the bar chart 432 corresponds.

In some implementations, the display assistant device 120 (e.g., processing circuitry 124) may assign a parametric value to each of a combination of sleep quality indicators. The display assistant device 120 may determine a time-varying sleep number (e.g., sleep index) of the user during the sleep session, and display a visualization (e.g., a graph) that shows changes in the sleep number as a function of time during the sleep session.

Figure 4D:
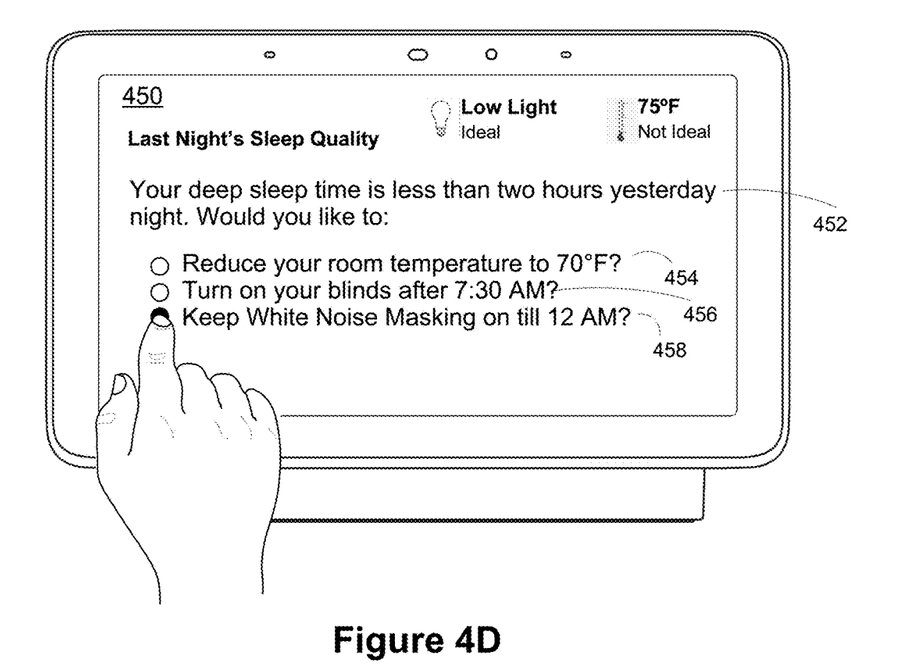
FIG. 4D illustrates a mitigation operation summary displayed on a display assistant device sat the end of a sleep session, in accordance with some implementations.

FIG. 4D illustrates a visual summary 450 displayed on a display assistant device 120 at the end of a sleep session in accordance with some implementations. The visual summary 450 includes a visual indication 452 of the sleep quality measured in terms of an amount of sleep in the deep sleep stage of the sleep phases (e.g., "Your deep sleep time is less than two hours yesterday night").

In some implementations, the display assistant device 120 (e.g., the processing circuitry 124) may also provide guidance (e.g., tips) to the user about managing their sleep environment based on analysis of the recorded events and/or mitigation of the sleep disturbances during the sleep session. Referring to FIG. 4D, in conjunction with presenting the visual indication 452, the display assistant device 120 further outputs to the user recommendation(s) for ameliorating one or more of the disturbances in subsequent sleep sessions of the user, including a first recommendation 454 to mitigate an ambient temperature ("Reduce your room temperature to 70° F."), a second recommendation 456 to mitigate an ambient light disturbance ("Turn on your blinds after 7:30 AM?"), and a third recommendation 458 to mitigate an ambient noise disturbance ("Keep White Noise Masking on till 12 AM?").

In some implementations, the display assistant device 120 also displays affordances that allow the user to replay sleep disturbances from the prior night's sleep session. Optionally, in some implementations, the processing circuitry 124 includes instructions to the display assistant device 120 to set a reminder to the user to address the sleep disturbances prior to the next sleep session, or to mitigate the sleep disturbances automatically via the sleep monitoring program 182.

Figure 5:
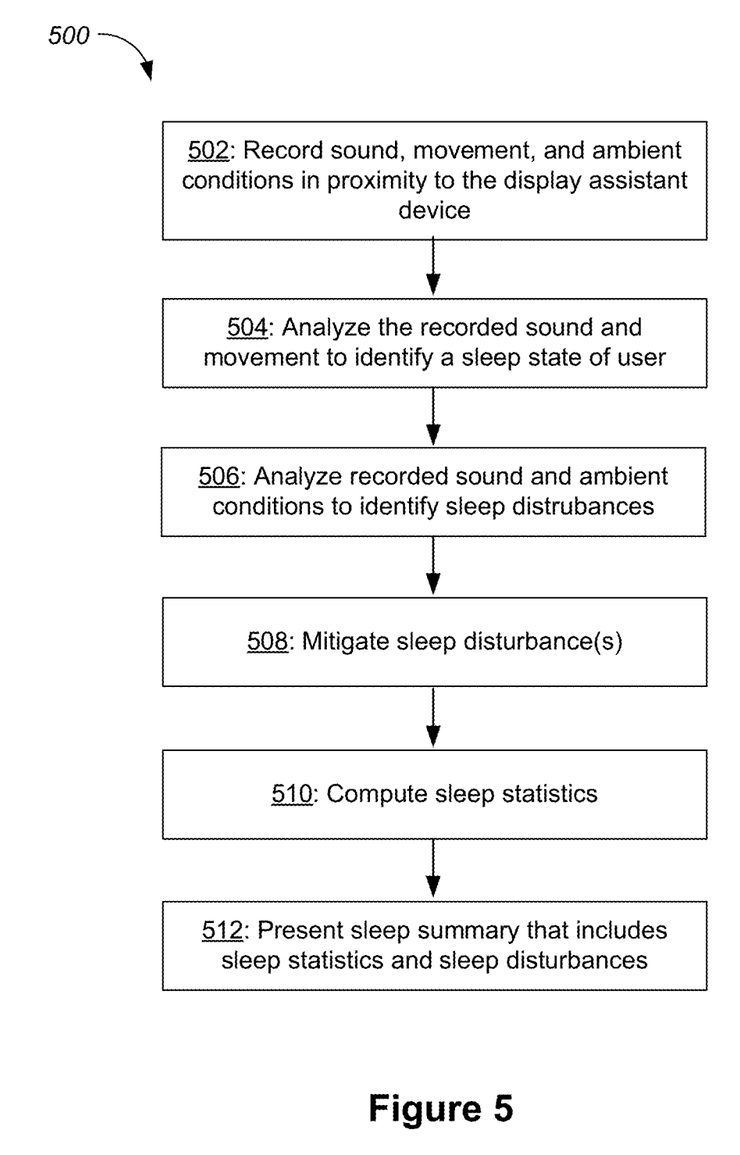
FIG. 5 is flowchart of an example process for determining sleep quality in accordance with some implementations.

FIG. 5 is a flow diagram illustrating an example process for determining sleep quality of a user of a display assistant device 120. In some implementations, the process 500 is governed by instructions that are stored in a computer memory or non-transitory computer readable storage medium (e.g., memory 122 storing the sleep monitoring program 182). The process 500 is executed by one or more processors of the display assistant device 120 (e.g., processing circuitry 124). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in process 500 may be combined and/or the order of some operations may be changed.

During a sleep session of the user, the display assistant device 120 records (502) sound, movement, r and ambient conditions in proximity to the display assistant device 120 (e.g., as described above with reference to FIG. 1). The display assistant device 120 analyzes (504) the recorded sound and the recorded movement to identify throughout the sleep session of the user a sleep state of the user (e.g., as described with reference to FIG. 1). The display assistant device 120 analyzes (506) the recorded ambient conditions and the recorded sound throughout the sleep session. As a result of the analysis, the display assistant device 120 identifies sleep disturbance(s) occurring during the sleep session (e.g., as described above with reference to FIG. 1). In some implementations, the display assistant device 120 mitigates (508) the sleep disturbances (e.g., by outputting white noise and/or controlling other connected devices, as described above with reference to FIG. 1). In some implementations, the display assistant device 120 also computes (510) sleep quality statistics, which may include sleep states, sleep phases, and sleep disturbances (e.g., as described above with reference to FIG. 1). After the sleep session of the user has concluded (e.g., when the sleep phase is an awakening phase), the display assistant device 120 presents (512) on a screen 204 a sleep summary that includes the sleep quality statistics and sleep disturbances (e.g., as described above with reference to FIGS. 4A to 4D).

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method of determining sleep quality of a user of a display assistant device, comprising:
    during a sleep session of the user:
        recording sound in proximity to the display assistant device;
        recording movement in proximity to the display assistant device;
        recording ambient conditions in proximity to the display assistant device, wherein the ambient conditions include a light level;
        analyzing the recorded sound and the recorded movement to identify throughout the sleep session of the user a sleep state of the user, wherein the sleep state is characterized by a sleep quality and a sleep phase; and
        analyzing the recorded ambient conditions and the recorded sound throughout the sleep session to identify a plurality of sleep disturbances occurring during the sleep session of the user; and
    after the sleep session of the user has concluded, presenting on a screen of the display assistant device a sleep summary of the sleep session, wherein:
        the sleep summary includes a plurality of data bars, wherein each data bar of the plurality of data bars is indicative of a different type of sleep disturbance of the plurality of sleep disturbances as a function of time throughout the sleep session; and
        the sleep summary includes a sleep data bar indicative of a depiction of sleep quality as a function of time throughout the sleep session.

2. The method of claim 1, wherein the plurality of data bars includes an indication for each occurrence of a sleep disturbance of the plurality of sleep disturbances.

3. The method of claim 1, further comprising:
    outputting to the user a recommendation for ameliorating one or more of the disturbances in subsequent sleep sessions of the user.

4. The method of claim 1, further comprising:
    during the sleep session of the user of the display assistant device:
        identifying, in the recorded sound, occurrences of noisy disturbance events in proximity to the display assistant device; and
        in accordance with a determination that the occurrences of noisy disturbance events and the associated sleep phase meet predefined noise masking criteria, generating by a speaker of the display assistant device a predefined white noise for masking upcoming noisy disturbance events.

5. The method of claim 1, further comprising:
    during the sleep session of the user of the display assistant device:
        determining in real time based on the recorded ambient signals and/or recorded sound for each of the identified disturbances a likely disturbance type selected from a plurality of predefined disturbance types; and
        in accordance with the likely disturbance type and availability of connected home devices in proximity to the display assistant device, controlling, by the display assistant device, one or more of the connected home devices to actively counteract in real time the identified disturbances.

6. The method of claim 5, wherein the connected home devices includes a thermostat device, further comprising, during the sleep session:
    obtaining an ambient temperature of an environment where the display assistant device is disposed;
    determining that the ambient temperature is out of a predefined temperature range, thereby determining a temperature-based disturbance type; and
    in accordance with a determination of the temperature-based disturbance type and an availability of the thermostat device, sending an instruction to the thermostat device to adjust the ambient temperature to the predefined temperature range.

7. The method of claim 1, further comprising:
    during the sleep session, determining in real time a user state based on the recorded movement and the recorded sound, the user state being selected from a group consisting of a sleep state, an in-bed state, and a movement state.

8. The method of claim 7, further comprising:
    controlling an output of the display assistant device according to user interface settings determined based on the user state, wherein the user interface settings includes at least an output content, an output format, a brightness level, a contrast level, and a speaker volume associated with the output of the display assistant device.

9. The method of claim 1, wherein the display assistant device includes a microphone configured to record the sound in proximity to the display assistant device.

10. The method of claim 1, wherein the display assistant device includes a motion sensor configured to detect fine and gross motions of the user of the display assistant device.

11. The method of claim 1, wherein the display assistant device includes one or more ambient sensors configured to record the ambient conditions in proximity to the display assistant device, and the one or more ambient sensors further includes at least an ambient light sensor configured to monitor the light level.

12. The method of claim 1, wherein the display assistant device includes one or more of a temperature sensor, ultrasonic sensor, infrared sensor, presence sensor, RADAR sensor, LiDAR sensor, and time-of-flight sensor for recording the movement or ambient conditions in proximity to the display assistant device.

13. The method of claim 1, wherein the display assistant device does not have a camera.

14. The method of claim 1, wherein the display assistant device is communicatively coupled to one or more connected home devices, and a subset of the movement or ambient conditions in proximity to the display assistant device is recorded via the one or more connected home devices.

15. The method of claim 1, wherein the display assistant device is communicatively coupled to a server system that hosts a virtual user domain including a user account, and is linked to the one or more connected home devices via the user account.

16. The method of claim 1, further comprising periodically identifying the sleep state of the user.

17. The method of claim 1, further comprising identifying the sleep state of the user by one or more of:
quantitatively characterizing the sleep quality within a predefined sleep quality range; and
associating the sleep phase with one of a plurality of predefined sleep phases.

18. An electronic device, comprising:
one or more processors;
a microphone;
a motion sensor;
one or more ambient sensors; a display; and
memory having instructions stored thereon, which when executed by the one or more processors cause the processors to:
during a sleep session of a user:
record sound in proximity to a display assistant device;
record movement in proximity to the display assistant device;
record ambient conditions in proximity to the display assistant device, wherein the ambient conditions include a light level;
analyze the recorded sound and the recorded movement to identify throughout the sleep session of the user a sleep state of the user, wherein the sleep state is characterized by a sleep quality and a sleep phase; and
analyze the recorded ambient conditions and the recorded sound throughout the sleep session to identify a plurality of sleep disturbances occurring during the sleep session of the user; and
after the sleep session of the user has concluded, cause a sleep summary of the sleep session to be presented on a screen of the display assistant device, wherein:
the sleep summary includes a plurality of data bars, wherein each data bar of the plurality of data bars is indicative of a different type of disturbance of the plurality of sleep disturbances as a function of time throughout the sleep session; and
the sleep summary includes a sleep data bar indicative of a depiction of sleep quality as a function of time throughout the sleep session.

19. A non-transitory computer-readable medium, having instructions stored thereon, which when executed by one or more processors cause the one or more processors to:
during a sleep session of a user:
record sound in proximity to a display assistant device;
record movement in proximity to the display assistant device;
record ambient conditions in proximity to the display assistant device, wherein the ambient conditions include a light level;
analyze the recorded sound and the recorded movement to identify throughout the sleep session of the user a sleep state of the user, wherein the sleep state is characterized by a sleep quality and a sleep phase; and
analyze the recorded ambient conditions and the recorded sound throughout the sleep session to identify a plurality of sleep disturbances occurring during the sleep session of the user; and
after the sleep session of the user has concluded, cause a sleep summary of the sleep session to be presented on a screen of the display assistant device, wherein:
the sleep summary includes a plurality of data bars, wherein each data bar of the plurality of data bars is indicative of a different type of disturbance of the plurality of sleep disturbances as a function of time throughout the sleep session; and
the sleep summary includes a sleep data bar indicative of a depiction of sleep quality as a function of time throughout the sleep session.

\* \* \* \* \*